United States Patent
Kurashina et al.

(10) Patent No.: US 8,961,747 B2
(45) Date of Patent: Feb. 24, 2015

(54) WATER ELECTROLYSIS SYSTEM AND METHOD OF STOPPING OPERATION OF WATER ELECTROLYSIS SYSTEM

(75) Inventors: Daisuke Kurashina, Wako (JP); Nobuyuki Kawasaki, Wako (JP); Hiroyuki Ishikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 238 days.

(21) Appl. No.: 13/603,326

(22) Filed: Sep. 4, 2012

(65) Prior Publication Data

US 2013/0062215 A1 Mar. 14, 2013

(30) Foreign Application Priority Data

Sep. 13, 2011 (JP) ................................. 2011-199554

(51) Int. Cl.
*C25B 15/02* (2006.01)
*C25B 1/10* (2006.01)
*C25B 9/00* (2006.01)

(52) U.S. Cl.
CPC ............... *C25B 15/02* (2013.01); *Y02E 60/366* (2013.01); *C25B 1/10* (2013.01); *C25B 9/00* (2013.01)
USPC ..................... 204/228.6; 204/228.5; 204/258; 205/637

(58) Field of Classification Search
USPC ..................... 204/228.5, 228.6, 258; 205/637
See application file for complete search history.

(56) References Cited

U.S. PATENT DOCUMENTS

| 2006/0118428 A1* | 6/2006 | Baltrucki et al. | 205/637 |
| 2007/0000773 A1* | 1/2007 | Blenkiron et al. | 204/258 |
| 2010/0230295 A1* | 9/2010 | Taruya et al. | 205/628 |

FOREIGN PATENT DOCUMENTS

JP 2010-236089 10/2010

* cited by examiner

*Primary Examiner* — Nicholas A Smith
(74) *Attorney, Agent, or Firm* — Mori & Ward, LLP (57) ABSTRACT

In a method of stopping an operation of a water electrolysis system, an on-off valve disposed in a pressure release line communicating with a cathode side of an electrolytic membrane is opened while an electrolytic current is applied between power feeders to electrolyze water for generating oxygen on an anode side of the electrolytic membrane and high pressure hydrogen having a higher pressure than a pressure of the oxygen on the cathode side. A value of the electrolytic current is reduced in a predetermined cycle or continuously. One of a specific resistance and conductivity of water to be supplied to the high pressure hydrogen producing apparatus is detected. The value of the electrolytic current is increased if the specific resistance is equal to or lower than a first predetermined value, or if the conductivity is equal to or higher than a second predetermined value.

9 Claims, 7 Drawing Sheets

WATER ELECTROLYSIS SYSTEM AND METHOD OF STOPPING OPERATION OF WATER ELECTROLYSIS SYSTEM

CROSS-REFERENCE TO RELATED APPLICATIONS

The present application claims priority under 35 U.S.C. §119 to Japanese Patent Application No. 2011-199554, filed Sep. 13, 2011, entitled "Water Electrolysis System AND Operation Stopping Method Therefor." The contents of this application are incorporated herein by reference in their entirety.

BACKGROUND OF THE INVENTION

1. Field of the Invention

The disclosure relates to a water electrolysis system and a method of stopping an operation of the water electrolysis system.

2. Discussion of the Background

For example, a solid polymer type fuel cells generate DC electric energy when anodes thereof are supplied with a fuel gas, i.e., a gas mainly composed of hydrogen, e.g., a hydrogen gas, and cathodes thereof are supplied with an oxygen-containing gas, a gas mainly composed of oxygen, e.g., air.

In general, a water electrolysis apparatus is used to produce a hydrogen gas as a fuel gas. This water electrolysis apparatus electrolyzes water to generate hydrogen (and oxygen), and uses a solid polymer electrolytic membrane (ion exchange membrane) for the electrolysis. Electrode catalytic layers are respectively provided on both sides of the solid polymer electrolytic membrane to form an electrolytic membrane/electrode assembly. Power feeders are respectively provided on both sides of the electrolytic membrane/electrode assembly to form a unit.

With a plurality of such units stacked, a voltage is applied to both ends of the stack of units in the laminating direction, and water is supplied to the anode side. As a result, water is decomposed to produce hydrogen ions (protons). The hydrogen ions permeate through the solid polymer electrolytic membrane to the cathode side, and are bonded with electrons to produce hydrogen. On the anode side, oxygen produced together with the hydrogen ions are discharged with excessive water from the units.

This type of water electrolysis apparatus uses a high pressure hydrogen producing apparatus which generates high pressure hydrogen (generally of 1 MPa or higher) on the cathode side. This high pressure hydrogen producing apparatus has high pressure hydrogen filed in the fluid passage of the cathode-side separator with a solid polymer electrolytic membrane disposed in between, and has water and oxygen of normal pressure present in the fluid passage of the anode-side separator. At the time of stopping the operation of the water electrolysis apparatus (stopping supplying generated hydrogen), therefore, it is necessary to eliminate the pressure difference between both sides of the solid polymer electrolytic membrane to protect the solid polymer electrolytic membrane.

Accordingly, normally, a process of forcibly lowering the pressure of hydrogen filled in the fluid passage of the cathode-side separator to near the normal pressure is carried out after the water electrolysis process is stopped by stopping supplying power to the individual power feeders.

If reduction of the hydrogen pressure takes place rapidly at that time, the hydrogen gas staying inside the solid polymer electrolytic membrane expands, which may produce blisters. It is therefore necessary to gradually reduce the hydrogen pressure. This takes a considerable time for the hydrogen pressure in the fluid passage of the cathode-side separator to become the normal pressure after the water electrolysis process is stopped, so that hydrogen is likely to permeate (cross leakage) to the anode side from the cathode side during the pressure reduction. This brings about a problem that the anode catalyst is reduced by hydrogen, thus degrading the water electrolysis performance.

As a solution to this problem, an operation stopping method for a water electrolysis system which is disclosed in Japanese Unexamined Patent Application Publication No. 2010-236089 includes a step of applying a voltage after supply of hydrogen from an electrolysis chamber on the cathode side is stopped, and a step of reducing the pressure at least in the cathode-side electrolysis chamber with the voltage applied.

This operation stopping method permits hydrogen leaked to the anode side from the cathode side to be protonated again with the voltage applied, and the protonated hydrogen is allowed to permeate through the electrolytic membrane to return to the cathode side due to the membrane pump effect. This makes it possible to suppress residence of high pressure hydrogen and thus inhibit reduction (deterioration) of the catalyst electrode with hydrogen, which would otherwise degrade the water electrolysis performance.

SUMMARY OF THE INVENTION

According to one aspect of the present invention, a method of stopping an operation of a water electrolysis system includes opening an on-off valve disposed in a pressure release line communicating with a cathode side of an electrolytic membrane while an electrolytic current is applied between power feeders to electrolyze water for generating oxygen on an anode side of the electrolytic membrane and high pressure hydrogen having a higher pressure than a pressure of the oxygen on the cathode side. The power feeders are respectively provided on the cathode and anode sides of the electrolytic membrane in a high pressure hydrogen producing apparatus of the water electrolysis system. A value of the electrolytic current is reduced in a predetermined cycle or continuously. One of a specific resistance and conductivity of water to be supplied to the high pressure hydrogen producing apparatus is detected. The value of the electrolytic current is increased if the specific resistance is equal to or lower than a first predetermined value, or if the conductivity is equal to or higher than a second predetermined value.

According to another aspect of the present invention, a method of stopping an operation of a water electrolysis system includes opening an on-off valve disposed in a pressure release line communicating with a cathode side of an electrolytic membrane while an electrolytic current is applied between power feeders to electrolyze water for generating oxygen on an anode side of the electrolytic membrane and high pressure hydrogen having a higher pressure than a pressure of the oxygen on the cathode side. The power feeders are respectively provided on the cathode and anode sides of the electrolytic membrane in a high pressure hydrogen producing apparatus of the water electrolysis system. A value of the electrolytic current is reduced in a predetermined cycle or continuously. One of a specific resistance and conductivity of water to be supplied to the high pressure hydrogen producing apparatus is detected. A pressure on the cathode side is detected. The value of the electrolytic current based on the pressure detected on the cathode side is increased if the specific resistance is equal to or lower than a first predetermined value, or if the conductivity is equal to or higher than a second predetermined value.

According to further aspect of the present invention, a method of stopping an operation of a water electrolysis system includes opening an on-off valve disposed in a pressure release line communicating with a cathode side of an electrolytic membrane while an electrolytic current is applied between power feeders to electrolyze water for generating oxygen on an anode side of the electrolytic membrane and high pressure hydrogen having a higher pressure than a pressure of the oxygen on the cathode side. The power feeders are respectively provided on the cathode and anode sides of the electrolytic membrane in a high pressure hydrogen producing apparatus of the water electrolysis system. A pressure on the cathode side is detected. An electrolytic current corresponding to the pressure detected on the cathode side is calculated from a map including a relation between an electrolytic current and a pressure on the cathode side to restrict water permeating to the cathode side. The electrolytic current calculated from the map is applied between the power feeders.

According to the other aspect of the present invention, a water electrolysis system includes a high pressure hydrogen producing apparatus, a gas-liquid separating apparatus, a return line, a supply line, and a detection device. The high pressure hydrogen producing apparatus includes an electrolytic membrane having a cathode side and an anode side, power feeders respectively provided on the cathode and anode sides of the electrolytic membrane, and an electrolytic power supply configured to apply an electrolytic current between the power feeders to electrolyze water for generating oxygen on the anode side and high pressure hydrogen having a higher pressure than a pressure of the oxygen on the cathode side. The gas-liquid separating apparatus is provided to separate, from unreacted water, a gas component to be discharged from the high pressure hydrogen producing apparatus. The return line is provided to supply the unreacted water containing the gas component to the gas-liquid separating apparatus. The supply line is provided to supply water stored in the gas-liquid separating apparatus to the high pressure hydrogen producing apparatus. The detection device is disposed in the supply line to detect one of a specific resistance and a conductivity of water to be supplied to the high pressure hydrogen producing apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
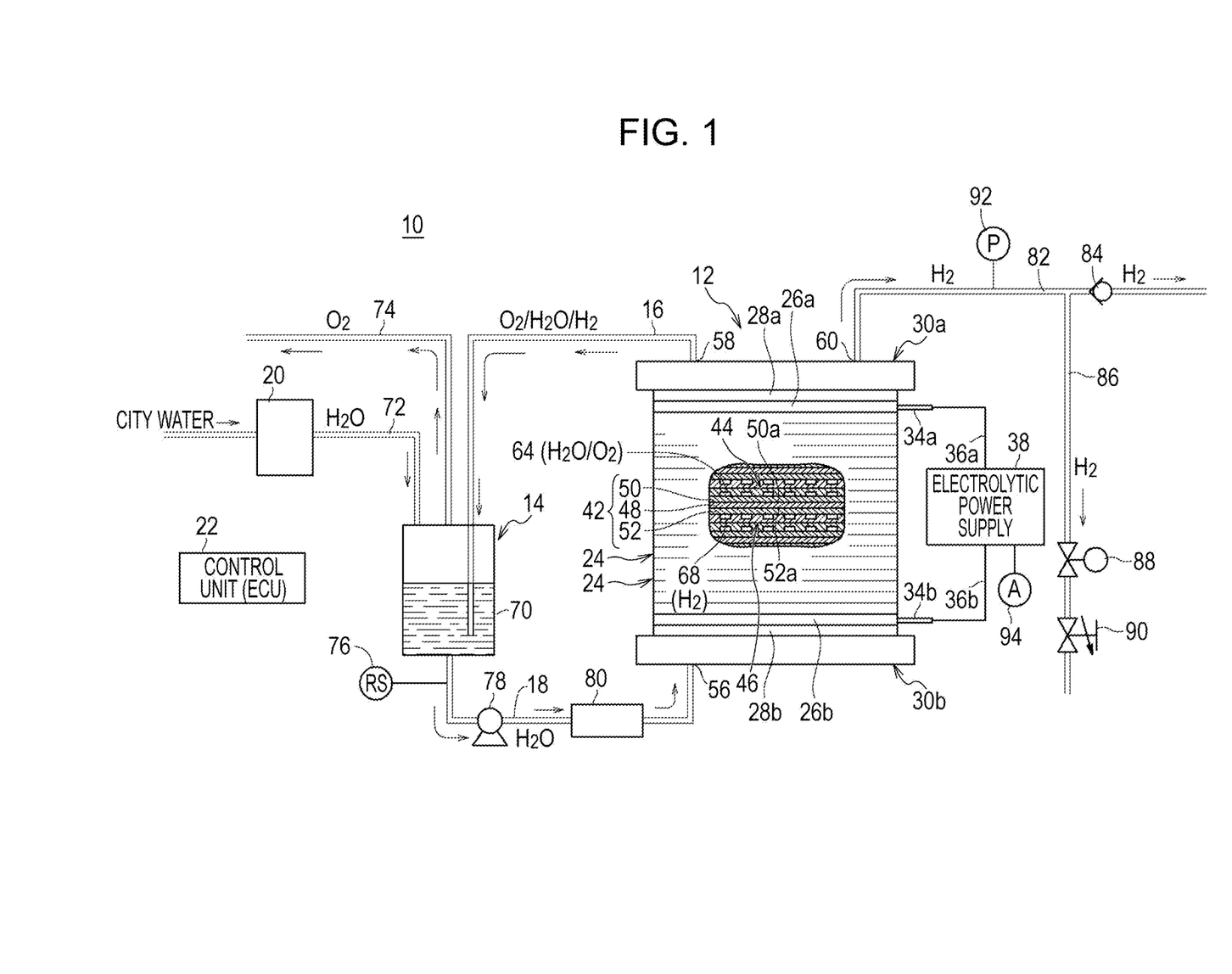
FIG. 1 is an explanatory diagram of the schematic configuration of a water electrolysis system to which an operation stopping method according to a first embodiment of the disclosure is applied.

As shown in FIG. 1, a water electrolysis system 10 to which an operation stopping method according to a first embodiment of the disclosure is applied includes a high pressure hydrogen producing apparatus (differential pressure type water electrolysis apparatus) 12, a gas-liquid separating apparatus 14 that has one end connected to the high pressure hydrogen producing apparatus 12, a return line 16, a supply line 18, a pure water producing apparatus 20, and a control unit (ECU) 22. The high pressure hydrogen producing apparatus 12 electrolyzes water (pure water) to produce oxygen and high pressure hydrogen (having a pressure higher than oxygen pressure which is normal pressure, e.g., hydrogen of 1 to 70 MPa). The gas-liquid separating apparatus 14 performs gas-liquid separation on unreacted water containing gas components (oxygen and hydrogen) to be discharged from the high pressure hydrogen producing apparatus 12. The return line 16 supplies the unreacted water containing the gas components to be discharged from the high pressure hydrogen producing apparatus 12 to the gas-liquid separating apparatus 14. The supply line 18 supplies water stored in the gas-liquid separating apparatus 14 to the high pressure hydrogen producing apparatus 12. The pure water producing apparatus 20 produces pure water from the water and supplies the pure water to the gas-liquid separating apparatus 14.

The high pressure hydrogen producing apparatus 12 is configured to include a stack of a plurality of unit cells 24. A terminal plate 26a, an insulator plate 28a and an end plate 30a are disposed outward in order at one end of the unit cells 24 in the stacking direction. Likewise a terminal plate 26b, an insulator plate 28b and an end plate 30b are disposed outward in order at the other end of the unit cells 24 in the stacking direction. The components between the end plates 30a, 30b are integrally fastened.

Terminal sections 34a, 34b are respectively provided on one sides of the terminal plates 26a, 26b so as to protrude outward. The terminal sections 34a, 34b are electrically connected to an electrolytic power supply 38 by wires 36a, 36b.

The unit cell 24 includes a disk-shaped electrolytic membrane/electrode assembly 42, an anode separator 44, and a cathode separator 46. The electrolytic membrane/electrode assembly 42 is held between the anode separator 44 and the cathode separator 46. The anode separator 44 and the cathode separator 46, which have disk shapes, are each formed from, for example, a carbon member, or a steel plate, a stainless steel plate, a titanium plate, an aluminum plate, a plated steel plate, or a press-molded metal plate having its surface subjected to corrosion-resistant surface processing, or a metal plate cut out and then subjected to corrosion-resistant surface processing.

The electrolytic membrane/electrode assembly 42 includes a solid polymer electrolytic membrane 48 having, for example, a thin film of perfluorosulfonic acid impregnated with water, an anode power feeder 50 and a cathode power feeder 52 respectively provided on both sides of the solid polymer electrolytic membrane 48.

An anode electrode catalytic layer 50a and a cathode electrode catalytic layer 52a are respectively formed on both sides of the solid polymer electrolytic membrane 48. An Ru (ruthenium) catalyst, for example, is used in the anode electrode catalytic layer 50a, and a platinum catalyst, for example, is used in the cathode electrode catalytic layer 52a.

The anode power feeder 50 and the cathode power feeder 52 are formed of, for example, a sintered substance of spherical atomized titanium powder (porous conductor). The anode power feeder 50 and the cathode power feeder 52 are provided with smooth surface portions to be subjected to etching after cutting. The percentage of voids of each of the anode power feeder 50 and the cathode power feeder 52 is set to a range of 10% to 50%, preferably a range of 20% to 40%.

A water supply hole 56 for supplying water (pure water), a discharge hole 58 for discharging oxygen, produced by a reaction, and unreacted water (mixed fluid), and a hydrogen supply hole 60 for supplying hydrogen produced by a reaction are provided in the outer peripheral portions of the unit cell 24. The water supply hole 56, the discharge hole 58 and the hydrogen supply hole 60 communicate with one another in the stacking direction.

A first passage 64 which communicates with the water supply hole 56 is provided on that side of the anode separator 44 which faces the electrolytic membrane/electrode assembly 42. This first passage 64, which is provided within a range corresponding to the surface area of the anode power feeder 50, includes a plurality of fluid grooves or a plurality of embossments or the like.

A second passage 68 which communicates with the hydrogen supply hole 60 is provided on that side of the cathode separator 46 which faces the electrolytic membrane/electrode assembly 42. This second passage 68, which is provided within a range corresponding to the surface area of the cathode power feeder 52, includes a plurality of fluid grooves or a plurality of embossments or the like.

The gas-liquid separating apparatus 14 includes a tank section 70. The tank section 70 is connected with the return line 16, the supply line 18, a water supply line 72, and a gas exhaust line 74. The return line 16 is connected to the discharge hole 58 of the high pressure hydrogen producing apparatus 12, and the supply line 18 is connected to the water supply hole 56 of the high pressure hydrogen producing apparatus 12. The pure water producing apparatus 20 is disposed in the water supply line 72. The gas exhaust line 74 has a capability of discharging oxygen and hydrogen which are separated from pure water at the tank section 70.

A resistivity meter (detection unit) 76, a circulation pump 78, and an ion removing apparatus (e.g., ionic exchange resin) 80 are disposed in the supply line 18 which is connected to the bottom of the tank section 70. The resistivity meter 76 is disposed between the tank section 70 and the circulation pump 78. Alternatively, the resistivity meter 76 may be disposed between the circulation pump 78 and the ion removing apparatus 80, or between the ion removing apparatus 80 and the water supply hole 56. As the detection unit, a conductivity meter (not shown) may be used in place of the resistivity meter 76.

A high pressure hydrogen line 82 is connected to the hydrogen supply hole 60 of the high pressure hydrogen producing apparatus 12. This high pressure hydrogen line 82 is provided with a check valve 84. The high pressure hydrogen line 82 is capable of supplying high pressure hydrogen (e.g., 35 MPa) as product hydrogen via an unillustrated back pressure valve. A pressure release line 86 is branched from a midway of the high pressure hydrogen line 82 from the upstream side of the check valve 84. The pressure release line 86 is provided with an on-off valve 88 and a flow regulating valve 90.

A pressure sensor 92 that detects the pressure at the cathode-side (second passage 68) outlet of the high pressure hydrogen producing apparatus 12 is disposed on the high pressure hydrogen line 82. The pressure sensor 92 and the resistivity meter 76 send detection signals to the control unit 22. A ammeter 94 provided at the electrolytic power supply 38 sends a detection signal to the control unit 22.

Figure 2:
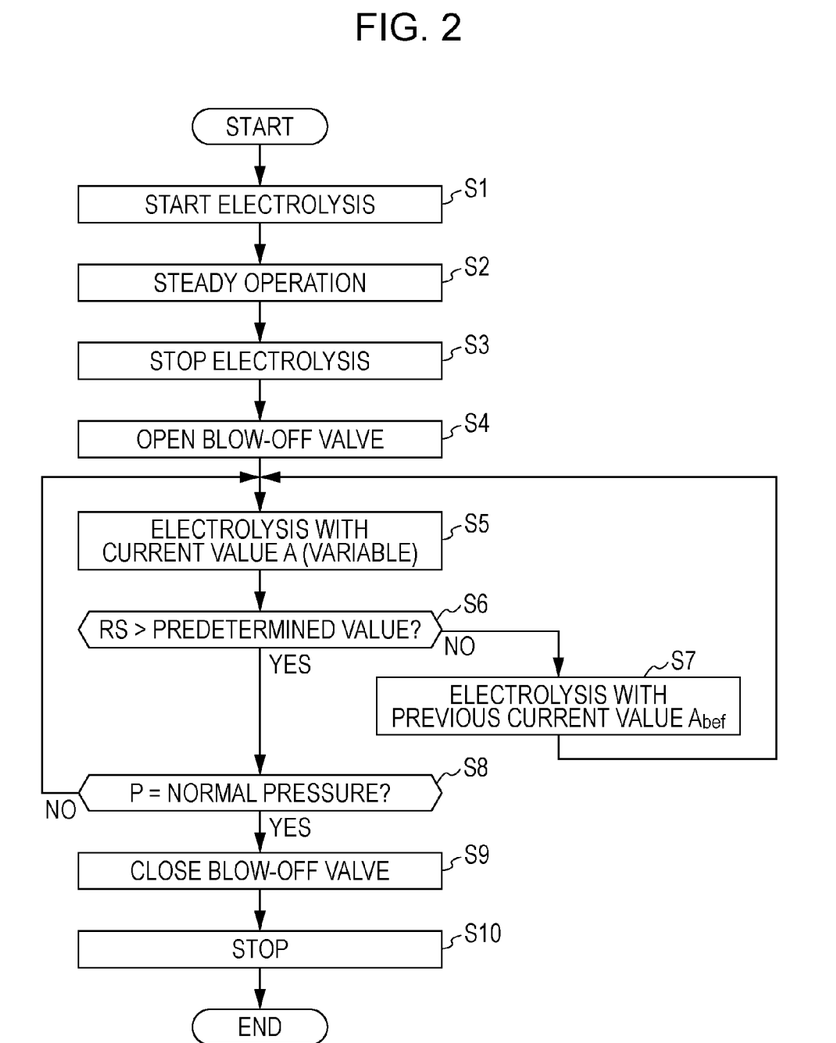
FIG. 2 is a flowchart illustrating the operation stopping method for the water electrolysis system according to the first embodiment.

The operation of the water electrolysis system 10 configured as described above will be described below in connection with the operation stopping method according to the first embodiment referring to the flowchart illustrated in FIG. 2.

First, when the water electrolysis system 10 is activated, pure water produced from city water by the pure water producing apparatus 20 is supplied to the tank section 70 constituting the gas-liquid separating apparatus 14. Then, with the circulation pump 78 in operation, water in the tank section 70 is supplied to the water supply hole 56 of the high pressure hydrogen producing apparatus 12 via the supply line 18. The electrolytic power supply 38, electrically connected to the terminal sections 34a, 34b of the terminal plates 26a, 26b, applies a voltage (electrolytic current) to the terminal sections 34a, 34b.

Accordingly, in each unit cell 24, water is supplied to the first passage 64 of the anode separator 44 through the water supply hole 56, and this water moves along the interior of the anode power feeder 50. Therefore, the water is electrolyzed by the anode electrode catalytic layer 50a, producing hydrogen ions, electrons and oxygen (step S1). The hydrogen ions produced by this anodic reaction permeate through the solid polymer electrolytic membrane 48 to move toward the cathode electrode catalytic layer 52a, and are bonded with the electrons to provide hydrogen.

The hydrogen flows along the second passage 68 formed between the cathode separator 46 and the cathode power feeder 52. This hydrogen keeps its pressure higher than the pressure in the water supply hole 56, so that the hydrogen can flow through the hydrogen supply hole 60 to be extracted outside the high pressure hydrogen producing apparatus 12 via the high pressure hydrogen line 82.

Meanwhile, the oxygen produced by the reaction, unreacted water, and permeated hydrogen flow through the first passage 64. The mixture of the oxygen, the unreacted water and the permeated hydrogen is discharged to the return line 16 along the discharge hole 58. This gas-fluid mixture is supplied to the tank section 70 constituting the gas-liquid separating apparatus 14 to be subjected to gas-liquid separation. The circulation pump 78 causes water to flow along the supply line 18 through the ion removing apparatus 80 where ions are removed. The ion-removed water is supplied to the water supply hole 56. The oxygen and hydrogen separated from the water are discharged outside through the gas exhaust line 74.

The steady operation is carried out in the above manner (step S2). When filling a fuel cell powered vehicle (not shown) with dry hydrogen completes, for example, the control unit 22 decides that the operation (electrolysis) of the water electrolysis system 10 is stopped (step S3). The decision on stopping of the operation may be based on another scheme, such as the OFF action of an unillustrated switch.

Next, the process advances to step S4 where the on-off valve 88 is opened so that the pressure release line 86 communicates with the hydrogen supply hole 60. As a result, the high pressure hydrogen filled in the second passage 68 on the cathode side is gradually reduced by regulating the angle of the flow regulating valve 90 disposed downstream of the on-off valve 88.

Figure 3:
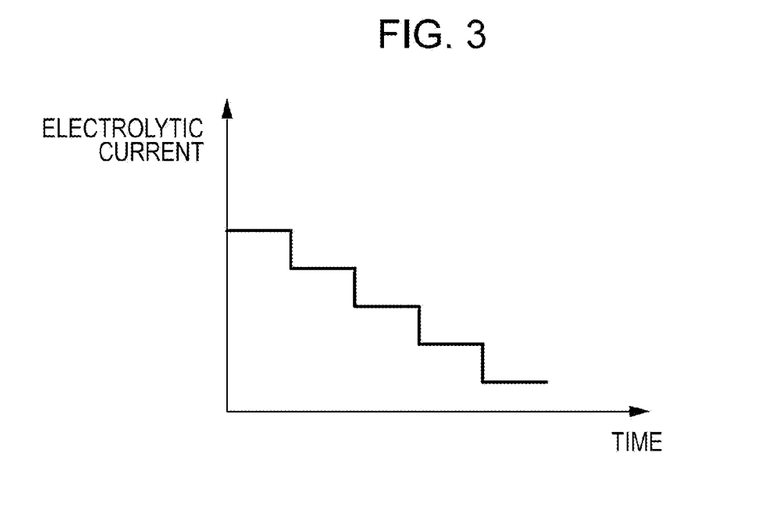
FIG. 3 is an explanatory diagram of an electrolytic current to be applied.

At this time, an electrolytic current value A smaller than the value of the electrolytic current is applied by the electrolytic power supply 38 (step S5). This electrolytic current value A is controlled in such a way that the current value is reduced stepwise every predetermined cycle as shown in FIG. 3. The electrolytic current value A may be controlled to be reduced continuously.

Figure 4:
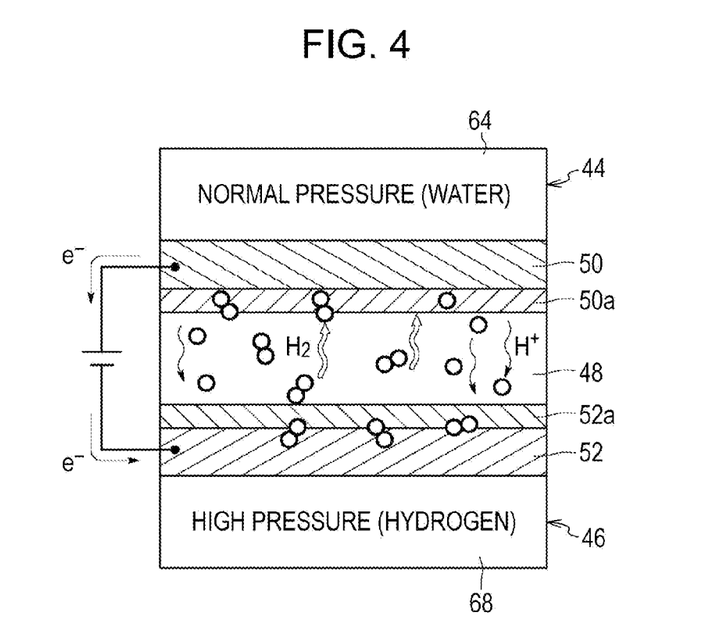
FIG. 4 is an explanatory diagram showing the behavior of hydrogen according to the operation stopping method.

The control unit 22 detects the specific resistance of water supplied to the high pressure hydrogen producing apparatus 12 by means of the resistivity meter 76 disposed in the supply line 18. At this time, hydrogen easily permeates through the solid polymer electrolytic membrane 48 to move from the second passage 68 under high pressure to the first passage 64 under normal pressure (cross leakage) as shown in FIG. 4.

When the amount of cross leakage is large as compared to the membrane pump effect, therefore, oxygen and hydrogen are likely to react with the catalyst, producing hydrogen peroxide ($H_2O_2$). This hydrogen peroxide is decomposed on the carbon carrier or platinum (Pt) in the electrode, producing, for example, hydroxyl radical (●OH), causing separation of a sulfo group ($SO_4^{2-}$) or the like.

Therefore, an impurity (anions or the like) is mixed in water discharged to the return line 16 from the discharge hole 58 of the high pressure hydrogen producing apparatus 12. This impurity is supplied to the gas-liquid separating apparatus 14, and is discharged to the supply line 18 from the tank section 70 under the operation of the circulation pump 78. The resistivity meter 76, which is disposed downstream of the tank section 70, detects the specific resistance, RS, of water passing through the supply line 18.

When the control unit 22 decides that the detected specific resistance RS is equal to or lower than a predetermined value, i.e., the amount of the impurity in water flowing downstream of the tank section 70 is equal to or greater than a specified amount (NO in step S6), the process advances to step S7. In case where a conductivity meter is used in place of the resistivity meter 76, when the control unit 22 decides that the conductivity detected by the conductivity meter is equal to or greater than a predetermined value, the process advances to step S7.

In step S7, the electrolytic current value A is increased to a value equal to or greater than at least a previous electrolytic current value $A_{bef}$ (the value is the previous electrolytic current value $A_{bef}$ in the first embodiment). Consequently, the electrolytic current value A is increased, so that the membrane pump effect is increased as compared to the amount of cross leakage, thus suppressing flow-out of the membrane component.

When the control unit 22 decides that the detected specific resistance RS exceeds the predetermined value (or that the detected conductivity is less than the predetermined value) (YES in step S6), on the other hand, the process advances to step S8. In step S8, it is determined whether pressure P detected by the pressure sensor 92, i.e., the pressure in the second passage 68, is equal to the pressure in the first passage 64 (normal pressure) or not.

When the pressure in the second passage 68 becomes normal pressure (YES in step S8), the process advances to step S9 to close the on-off valve 88. Then, the application of the voltage by the electrolytic power supply 38 is stopped to stop the operation of the water electrolysis system 10 (step S10).

In this case, the resistivity meter 76 is disposed in the supply line 18 according to the first embodiment. When it is determined from the result of the detection by the resistivity meter 76 that the specific resistance of water supplied to the high pressure hydrogen producing apparatus 12 has decreased (or the conductivity of water has increased), i.e., when flow-out of the membrane component of the solid polymer electrolytic membrane 48 is detected, the electrolytic current value A is increased to a value equal to at least the previous electrolytic current value $A_{bef}$ or greater.

As a result, the membrane pump effect of hydrogen is improved as compared to the amount of cross leakage of hydrogen, suppressing flow-out of the membrane component. What is more, the electrolytic current value A is controlled in such a way that the current value is reduced stepwisely every predetermined cycle as shown in FIG. 3. It is therefore possible to reliably inhibit flow-out of the membrane component and suppress the amount of consumption of hydrogen as much as possible after the operation of the water electrolysis system 10 is stopped. This brings about the advantage such that the overall system efficiency of the water electrolysis system 10 can be improved.

Further, the resistivity meter 76 is disposed upstream of the ion removing apparatus 80 in the supply line 18. If the amount of a change (amount of reduction) in the specific resistance RS detected by the resistivity meter 76 lies within a predetermined range, therefore, the impurity can be removed with the absorption action of the ion removing apparatus 80.

When the amount of a change (amount of reduction) in the specific resistance RS detected by the resistivity meter 76 is equal to or greater than a predetermined value, therefore, it is considered that the flow-out of the membrane component has occurred. Then, the electrolytic current value A is increased to a value equal to at least the previous electrolytic current value $A_{bef}$ or greater, thus suppressing reduction in specific resistance.

In case where the resistivity meter 76 is disposed downstream of the ion removing apparatus 80, on the other hand, when the detected specific resistance RS is lower than a threshold value, it is considered that the flow-out of the membrane component has occurred. Then, the electrolytic current value A has only to be increased to a value equal to at least the previous electrolytic current value $A_{bef}$ or greater, thus suppressing reduction in specific resistance.

Figure 5:
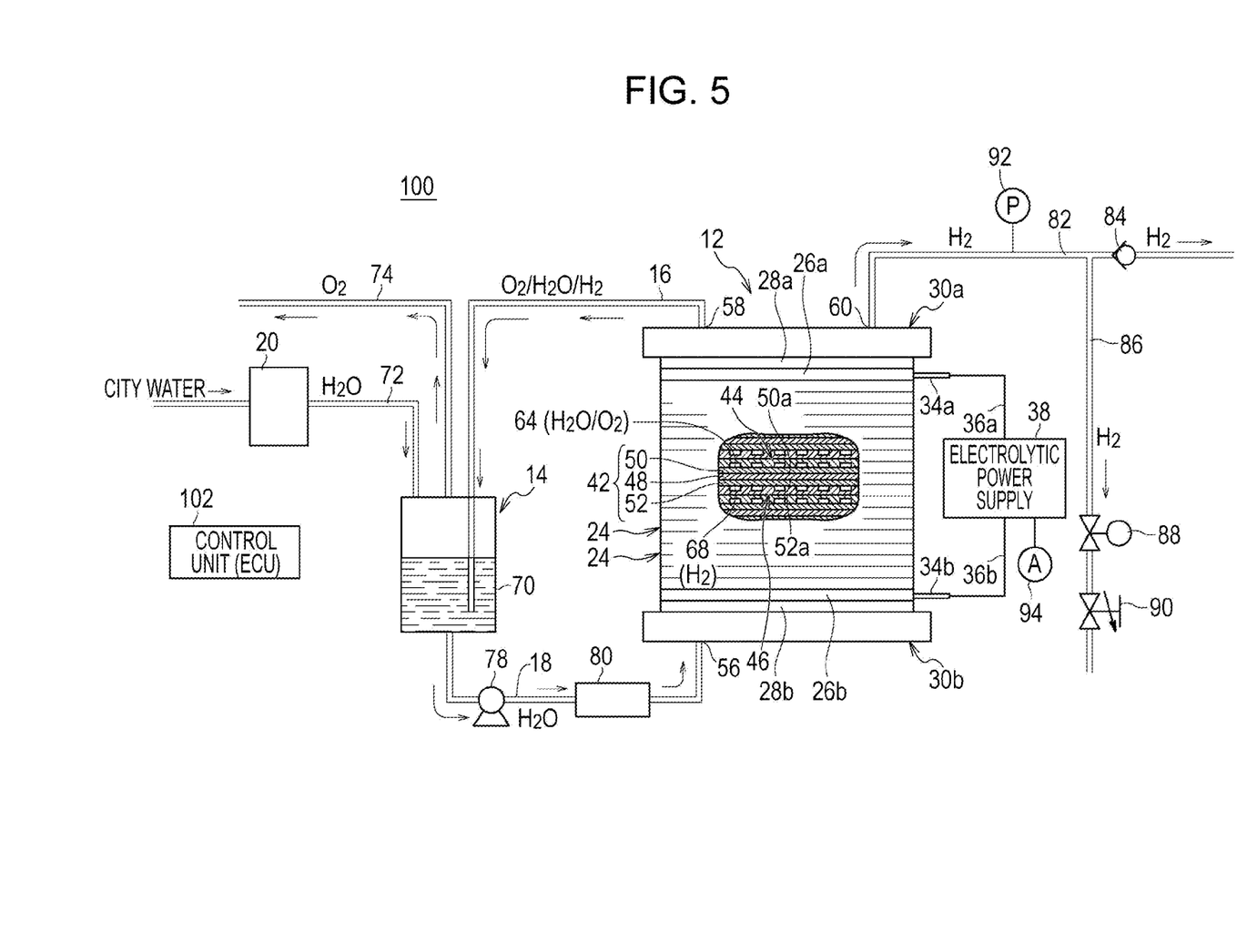
FIG. 5 is an explanatory diagram of the schematic configuration of a water electrolysis system to which an operation stopping method according to a second embodiment of the disclosure is applied.

FIG. 5 is an explanatory diagram of the schematic configuration of a water electrolysis system 100 to which an operation stopping method according to a second embodiment of the disclosure is applied. To avoid the redundant description, like or same reference numerals are given to those components which are the same as the corresponding components of the water electrolysis system 10 according to the first embodiment.

Figure 6:
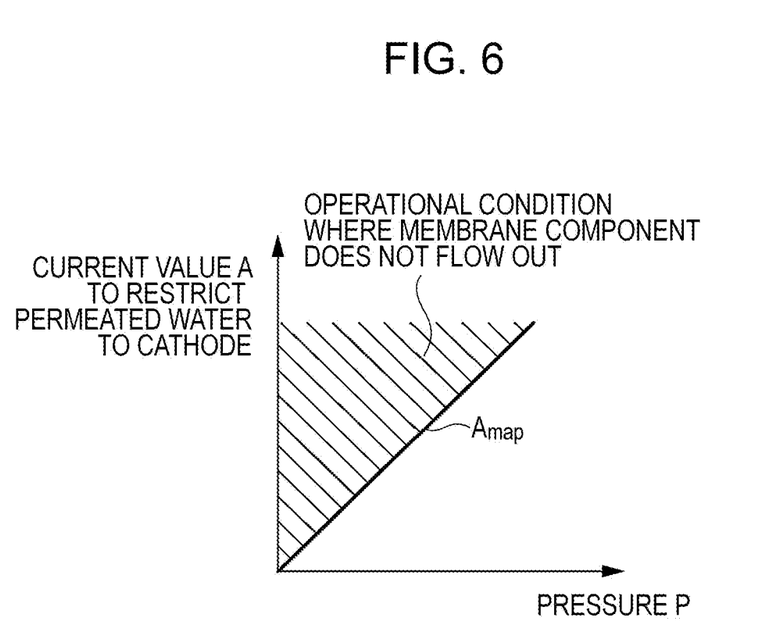
FIG. 6 is a control map showing the relation between pressure and the value of current.

The water electrolysis system 100 includes a control unit 102, but does not use the resistivity meter 76. The control unit 102 previously sets the relation between the pressure at the cathode side (second passage 68) outlet of the high pressure hydrogen producing apparatus 12 and the electrolytic current value A which restricts permeated water to the cathode side, and creates a map representing the relation, as shown in FIG. 6. The state where there is no water permeation to the cathode side means that there is no flow-out of the membrane component. A current value equal to or less than an electrolytic current value $A_{map}$ corresponding to a predetermined pressure results in an insufficient membrane pump effect, causing flow-out of the membrane component.

Figure 7:
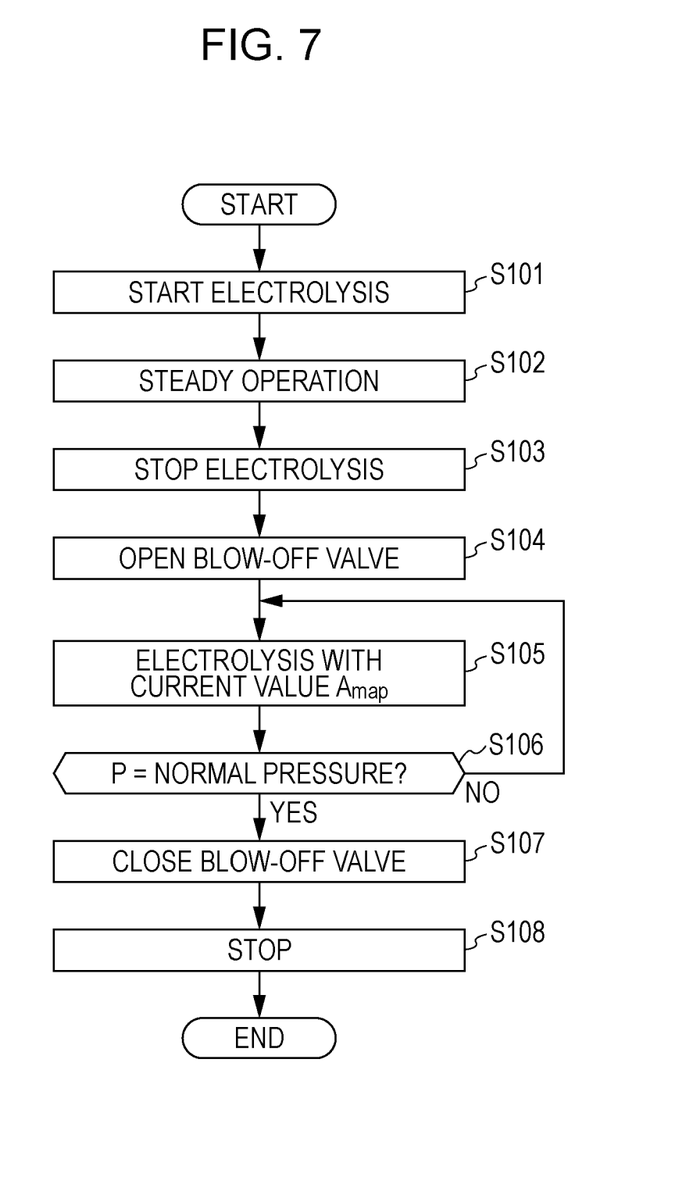
FIG. 7 is a flowchart illustrating the operation stopping method according to the second embodiment.

The operation stopping method according to the second embodiment will be described below referring to the flow-chart illustrated in FIG. 7. The same steps as those of the operation stopping method according to the first embodiment will be described briefly.

When electrolysis of the water electrolysis system 100 is initiated (step S101), the steady operation is performed as done by the water electrolysis system 10 (step S102). When stopping of electrolysis is detected (step S103), the process advances to step 5104 where the on-off valve 88 is opened to start the pressure reducing process.

Here, the outlet pressure P of the second passage 68 of the high pressure hydrogen producing apparatus 12 is detected by the pressure sensor 92. The control unit 102 calculates (reads) the electrolytic current value $A_{map}$ corresponding to the detected pressure P from the map shown in FIG. 6, and controls the electrolytic power supply 38 (step S105). Accordingly, the electrolytic current value $A_{map}$ small enough not to cause water permeation to the cathode side, i.e., not to cause flow-out of the membrane component is applied to the high pressure hydrogen producing apparatus 12.

When the pressure in the second passage 68 becomes normal pressure (YES in step S106), the process advances to step S107 to close the on-off valve 88. Thereafter, application of the voltage by the electrolytic power supply 38 is stopped, thereby stopping the operation of the water electrolysis system 100 (step S108).

In this case, the relation between the pressure P at the cathode side outlet which restricts permeated water to the cathode side and the electrolytic current value A is created as a map, and the electrolytic current value A (electrolytic current value $A_{map}$) corresponding to the cathode-side outlet pressure P is calculated from the map, and is applied.

As a result, it is possible to reliably inhibit flow-out of the membrane component and suppress the amount of consumption of hydrogen as much as possible after the operation of the water electrolysis system 100 is stopped. This brings about the advantage such that the overall system efficiency of the water electrolysis system 100 can be improved.

Figure 8:
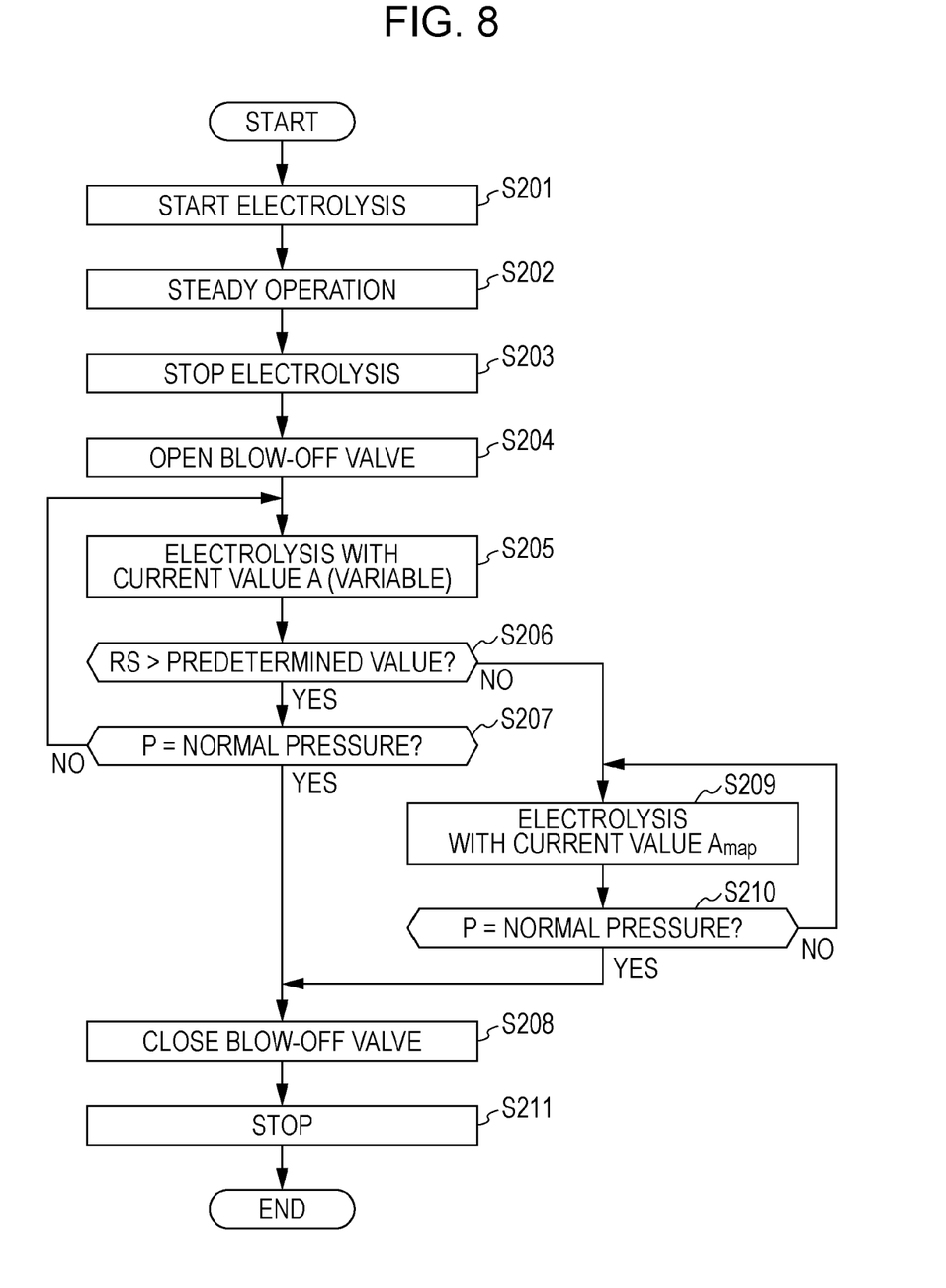
FIG. 8 is a flowchart illustrating an operation stopping method according to a third embodiment.

Next, an operation stopping method according to a third embodiment will be described below referring to the flowchart illustrated in FIG. 8.

This operation stopping method uses the water electrolysis system 10 (first embodiment) which includes the control unit 102 (second embodiment). The same steps as those of the operation stopping methods according to the first and second embodiments will be described briefly.

Like steps S1 to S5, steps S201 to S205 are performed. In step S205, the electrolytic current value A is applied, and is controlled to be reduced stepwisely. When it is decided that the detected specific resistance RS exceeds a predetermined value (YES in step S206), the process advances to step S207.

When it is decided that the detected specific resistance RS is equal to or lower than the predetermined value (NO in step S206), on the other hand, the process advances to step S209. In step S209, the electrolytic current value $A_{map}$ corresponding to the detected pressure P is calculated to control the electrolytic power supply 38. Then, the process advances to step S210.

Accordingly, the third embodiment provides advantages similar to those of the first embodiment and the second embodiment.

According to a first aspect of an exemplary embodiment of the disclosure, there is provided a method of stopping an operation of a water electrolysis system equipped with a high pressure hydrogen producing apparatus which has power feeders provided on both sides of an electrolytic membrane and applies an electrolytic current between the power feeders to electrolyze water, generating oxygen on an anode side and generating high pressure hydrogen having a higher pressure than a pressure of the hydrogen on a cathode side.

This operation stopping method includes the steps of opening an on-off valve disposed in a pressure release line communicating with the cathode side with the electrolytic current applied, reducing a value of the electrolytic current every predetermined cycle or continuously, detecting a specific resistance or conductivity of the water to be supplied to the high pressure hydrogen producing apparatus, and increasing the value of the electrolytic current when the specific resistance changes to a predetermined value or lower, or when the conductivity changes to a predetermined value or higher.

According to the first aspect, the value of the electrolytic current is increased when the specific resistance of water to be supplied to the high pressure hydrogen producing apparatus changes to a predetermined value or lower or when the conductivity of the water changes to a predetermined value or higher, i.e., when flow-out of a membrane component is detected. This improves the membrane pump effect of hydrogen against the amount of cross leakage of hydrogen, suppressing the flow-out of a membrane component.

Accordingly, it is possible to reliably inhibit flow-out of a membrane component and suppresses the amount of consumption of hydrogen as much as possible after the operation of the water electrolysis system is stopped, thereby improving the system efficiency.

According to a second aspect of the exemplary embodiment of the disclosure, the operation stopping method includes opening an on-off valve disposed in a pressure release line communicating with the cathode side with the electrolytic current applied, reducing a value of the electrolytic current every predetermined cycle or continuously, detecting a specific resistance or conductivity of the water to be supplied to the high pressure hydrogen producing apparatus, detecting a pressure on the cathode side, and controlling the value of the electrolytic current based on the detected pressure on the cathode side when the specific resistance changes to a predetermined value or lower, or when the conductivity changes to a predetermined value or higher.

According to the second aspect, the value of the electrolytic current is controlled based on the detected pressure on the cathode side when the specific resistance of water changes to a predetermined value or lower, or when the conductivity of water changes to a predetermined value or higher. This can provide an optimal electrolytic current value according to the pressure on the cathode side. It is therefore possible to reliably inhibit flow-out of a membrane component and suppresses the amount of consumption of hydrogen as much as possible after the operation of the water electrolysis system is stopped, thereby improving the system efficiency.

According to a third aspect of the exemplary embodiment of the disclosure, the operation stopping method includes creating as a map a relation between a pressure on the cathode side to restrict permeated to the cathode side water and the electrolytic current, opening an on-off valve disposed in a pressure release line communicating with the cathode side with the electrolytic current applied, detecting the pressure on the cathode side, and calculating the electrolytic current corresponding to the detected pressure on the cathode side from the map, and applying the calculated electrolytic current.

According to the third aspect, the relation between the pressure on the cathode side to restrict permeated to the cathode side water and the electrolytic current is created as a map, and the electrolytic current corresponding to the detected pressure on the cathode side is calculated from the map. Accordingly, it is possible to reliably inhibit flow-out of a membrane component and suppresses the amount of consumption of hydrogen as much as possible after the operation of the water electrolysis system is stopped, thereby improving the system efficiency.

According to a fourth aspect of the exemplary embodiment of the disclosure, there is provided a water electrolysis system including a high pressure hydrogen producing apparatus that has power feeders provided on both sides of an electrolytic membrane and applies an electrolytic current between the power feeders to electrolyze water, generating oxygen on an anode side and generating high pressure hydrogen having a higher pressure than a pressure of the hydrogen on a cathode side, a gas-liquid separating apparatus that performs gas-liquid separation on unreacted water containing a gas component to be discharged from the high pressure hydrogen producing apparatus, a return line that supplies the unreacted water containing the gas component to be discharged from the high pressure hydrogen producing apparatus to the gas-liquid separating apparatus, and a supply line that supplies water stored in the gas-liquid separating apparatus to the high pressure hydrogen producing apparatus.

This water electrolysis system has a detection unit disposed in the supply line to detect a specific resistance or a conductivity of the water to be supplied to the high pressure hydrogen producing apparatus.

According to the fourth aspect, the detection unit that detects the specific resistance or the conductivity of water to be supplied to the high pressure hydrogen producing apparatus is disposed in the supply line. It is therefore possible to detect the specific resistance or the conductivity of water to be supplied to the high pressure hydrogen producing apparatus, so that flow-out of a membrane component can be reliably inhibited and the amount of consumption of hydrogen can be suppressed as much as possible after the operation of the water electrolysis system is stopped, thereby improving the system efficiency.

Obviously, numerous modifications and variations of the present invention are possible in light of the above teachings. It is therefore to be understood that within the scope of the appended claims, the invention may be practiced otherwise than as specifically described herein.

What is claimed is:

1. A method of stopping an operation of a water electrolysis system, the method comprising:
   opening an on-off valve disposed in a pressure release line communicating with a cathode side of an electrolytic membrane while an electrolytic current is applied between power feeders to electrolyze water for generating oxygen on an anode side of the electrolytic membrane and high pressure hydrogen having a higher pressure than a pressure of the oxygen on the cathode side, the power feeders being respectively provided on the cathode and anode sides of the electrolytic membrane in a high pressure hydrogen producing apparatus of the water electrolysis system;
   reducing a value of the electrolytic current in a predetermined cycle or continuously;
   detecting one of a specific resistance and conductivity of water to be supplied to the high pressure hydrogen producing apparatus; and
   increasing the value of the electrolytic current if the specific resistance is equal to or lower than a first predetermined value, or if the conductivity is equal to or higher than a second predetermined value.

2. The method according to claim 1, further comprising:
   determining whether a pressure on the cathode side is equal to a pressure on the anode side; and
   closing the on-off valve if the pressure on the cathode side is equal to the pressure on the anode side.

3. A method of stopping an operation of a water electrolysis system, the method comprising:
   opening an on-off valve disposed in a pressure release line communicating with a cathode side of an electrolytic membrane while an electrolytic current is applied between power feeders to electrolyze water for generating oxygen on an anode side of the electrolytic membrane and high pressure hydrogen having a higher pressure than a pressure of the oxygen on the cathode side, the power feeders being respectively provided on the cathode and anode sides of the electrolytic membrane in a high pressure hydrogen producing apparatus of the water electrolysis system;
   reducing a value of the electrolytic current in a predetermined cycle or continuously;
   detecting one of a specific resistance and conductivity of water to be supplied to the high pressure hydrogen producing apparatus;
   detecting a pressure on the cathode side; and
   controlling the value of the electrolytic current based on the pressure detected on the cathode side if the specific resistance is equal to or lower than a first predetermined value, or if the conductivity is equal to or higher than a second predetermined value.

4. The method according to claim 3, further comprising:
   detecting a pressure on the cathode side,
   wherein the controlling of the value of the electrolytic current includes calculating an electrolytic current corresponding to the pressure detected on the cathode side from a map including a relation between an electrolytic current and a pressure on the cathode side to restrict water permeating to the cathode side if the specific resistance is equal to or lower than a first predetermined value, or if the conductivity is equal to or higher than a second predetermined value.

5. The method according to claim 3, further comprising:
   determining whether a pressure on the cathode side is equal to a pressure on the anode side; and
   closing the on-off valve if the pressure on the cathode side is equal to the pressure on the anode side.

6. A method of stopping an operation of a water electrolysis system, the method comprising:
   opening an on-off valve disposed in a pressure release line communicating with a cathode side of an electrolytic membrane while an electrolytic current is applied between power feeders to electrolyze water for generating oxygen on an anode side of the electrolytic membrane and high pressure hydrogen having a higher pressure than a pressure of the oxygen on the cathode side, the power feeders being respectively provided on the cathode and anode sides of the electrolytic membrane in a high pressure hydrogen producing apparatus of the water electrolysis system;
   detecting a pressure on the cathode side;
   calculating an electrolytic current corresponding to the pressure detected on the cathode side from a map including a relation between an electrolytic current and a pressure on the cathode side to restrict water permeating to the cathode side; and
   applying the electrolytic current calculated from the map between the power feeders.

7. The method according to claim 6, further comprising:
   determining whether a pressure on the cathode side is equal to a pressure on the anode side; and closing the on-off valve if the pressure on the cathode side is equal to the pressure on the anode side.

8. A water electrolysis system comprising:
a high pressure hydrogen producing apparatus comprising:
   an electrolytic membrane having a cathode side and an anode side;
   power feeders respectively provided on the cathode and anode sides of the electrolytic membrane; and
   an electrolytic power supply configured to apply an electrolytic current between the power feeders to electrolyze water for generating oxygen on the anode side and high pressure hydrogen having a higher pressure than a pressure of the oxygen on the cathode side;
a gas-liquid separating apparatus to separate, from unreacted water, a gas component to be discharged from the high pressure hydrogen producing apparatus;
a return line to supply the unreacted water containing the gas component to the gas-liquid separating apparatus;
a supply line to supply water stored in the gas-liquid separating apparatus to the high pressure hydrogen producing apparatus;
a detection device disposed in the supply line to detect one of a specific resistance and a conductivity of water to be supplied to the high pressure hydrogen producing apparatus
a pressure release line communicating with the cathode side;
an on-off valve disposed in the pressure release line to reduce a pressure on the cathode side; and
a controller configured to reduce a value of the electrolytic current applied between the power feeders in a predetermined cycle or continuously after the on-off valve opens to reduce the pressure on the cathode side, the controller being configured to increase the value of the electrolytic current applied between the power feeders if the specific resistance detected by the detection device is equal to or lower than a first predetermined value, or if the conductivity detected by the detection device is equal to or higher than a second predetermined value.

9. The water electrolysis system according to claim 8, wherein the controller closes the on-off valve if a pressure on the cathode side is equal to a pressure on the anode side.

* * * * *